United States Patent
Coron

(10) Patent No.: US 8,971,526 B2
(45) Date of Patent: Mar. 3, 2015

(54) METHOD OF COUNTER-MEASURING AGAINST SIDE-CHANNEL ATTACKS

(75) Inventor: Jean-Sebastien Coron, Rueil-Malmaison (FR)

(73) Assignee: Crocus-Technology SA, Grenoble (FR)

( * ) Notice: Subject to any disclaimer, the term of this patent is extended or adjusted under 35 U.S.C. 154(b) by 0 days.

(21) Appl. No.: 13/547,098

(22) Filed: Jul. 12, 2012

(65) Prior Publication Data

US 2013/0028412 A1 Jan. 31, 2013

(30) Foreign Application Priority Data

Jul. 26, 2011 (EP) .................................. 11290337

(51) Int. Cl.
*G06F 21/00* (2013.01)
*H04L 9/00* (2006.01)
*H04L 9/06* (2006.01)

(52) U.S. Cl.
CPC .............. *H04L 9/003* (2013.01); *H04L 9/0631* (2013.01); *H04L 2209/046* (2013.01); *H04L 2209/08* (2013.01)

USPC ................................ 380/28; 380/44; 713/189

(58) Field of Classification Search
USPC .......................................................... 380/28
See application file for complete search history.

(56) References Cited

U.S. PATENT DOCUMENTS

| 2008/0019503 | A1* | 1/2008 | Dupaquis et al. | 380/28 |
| 2011/0033043 | A1* | 2/2011 | Gebotys | 380/28 |
| 2011/0044450 | A1* | 2/2011 | Choi et al. | 380/28 |

* cited by examiner

*Primary Examiner* — Yogesh Paliwal
(74) *Attorney, Agent, or Firm* — Pearne & Gordon LLP

(57) ABSTRACT

According to the present invention there is provided a method of counter-measuring against side channel attacks, the method comprising executing a block-cipher algorithm to mask intermediate variables, wherein the block-cipher algorithm comprises one or more non-linear functions, characterized in that at least one of the non-linear functions is implemented using a match-in-place function.

13 Claims, 4 Drawing Sheets

```
Cipher(byte in[16], byte out[16], word w[44])
begin
    byte state[16]
    state=in
    AddRoundKey(state,w[0,3])
    for round=1 to 9
        SubBytes(state)
        ShiftRows(state)
        MixColumns(state)
        AddRoundKey(state,w[round*4,(round+1)*4-1])
    end for
    SubBytes(state)
    ShiftRows(state)
    AddRoundKey(state,w[40,43])
end
```

```
Cipher(byte in[16], byte out[16], word w[44])
begin
    byte state[16]
    state=in
    AddRoundKey(state,w[0,3])
    for round=1 to 9
        SubBytes(state)
        ShiftRows(state)
        MixColumns(state)
        AddRoundKey(state,w[round*4,(round+1)*4-1])
    end for
    SubBytes(state)
    ShiftRows(state)
    AddRoundKey(state,w[40,43])
end
```

Figure 1

```
InvCipher(byte in[16], byte out[16], word w[44])
begin
    byte state[16]
    state=in
    AddRoundKey(state,w[40,43])
    for round=9 downto 1
        InvShiftRows(state)
        InvSubBytes(state)
        AddRoundKey(state,w[round*4,(round+1)*4-1])
        InvMixColumns(state)
    end for
    InvShiftRows(state)
    InvSubBytes(state)
    AddRoundKey(state,w[0,3])
end
```

Figure 2

|  | Transfers (prepro.) | XOR | Transfers | RAM |
|---|---|---|---|---|
| Original implementation [7] | $2^n + 1$ | 2 | 1 | $2^n$ |
| Using MIP | --- | --- | 1 | 1 |

Figure 3

|  | XOR | Transfers | RAM |
|---|---|---|---|
| RDP2: original implementation [7] | $6 \cdot 2^n$ | $3 \cdot 2^n + 1$ | $2^n$ |
| RDP2: using MIP | $4 \cdot 2^n$ | $2 \cdot 2^n$ | 1 |

Figure 4

METHOD OF COUNTER-MEASURING AGAINST SIDE-CHANNEL ATTACKS

FIELD

The present invention concerns a method of counter-measuring against side-channel attacks for block-ciphers, and in particular, but not exclusively, to a method of counter-measuring which uses a match-in-place function.

DESCRIPTION OF RELATED ART

Many existing encryption algorithms in use today, such as the most widely used encryption algorithm 'Advanced Encryption Standard (AES)' are vulnerable to Differential Power Analysis (DPA). DPA is a side-channel attack that consists in first measuring a microprocessor's power consumption when executing a cryptographic algorithm and then performing statistical analysis in order to recover secret-keys used in the cryptographic algorithm for encryption. Once the secret-keys have been determined it is possible to decrypt encrypted information.

A microprocessor's electromagnetic emanations can also be measured and exploited to determine secret-keys used in a cryptographic algorithm for encryption.

A common technique to protect secret-key algorithms against DPA consists of masking every intermediate variable with a random mask. The masked data and the random mask are then processed separately and eventually recombined at the end of the algorithm. An attacker trying to analyze the power consumption of a microprocessor at a single point will obtain random values (random data values and random mask values); therefore, such masking will be secure against first-order DPA.

A masking counter-measure is characterized by the number of random masks used to protect a given sensitive variable; a masking with d random masks is called a d-th order masking. A d-th order masking can only be broken by a $(d+1)^{th}$ order side-channel analysis, i.e. an attack that requires the processing of d+1 variables simultaneously. The number of executions required to break a counter-measure grows exponentially with the order d. Therefore, the order d is a good security criterion. However, in practice the most efficient counter-measures are of order d=1 only It has been shown that a second-order DPA attacks to decrypt masked data is possible. Therefore, better counter-measures are needed in order to obtain fully secure encryption of data.

Further developments in counter-measures have been made; one of the most recent counter-measures against side-channel attacks is a counter-measure with order d=2.

For any masking counter-measure the main difficulty is to protect the non-linear parts of the algorithm; for Advanced Encryption Standard (AES) the non-linear parts of the algorithm are essentially SBOX functions. The technique used consists of iterating over the entire SBOX function for every SBOX look-up, using a comparison algorithm that is implemented as a subroutine. The comparison algorithm being called for every SBOX input, it is possible to show that the counter-measure can resist any second-order side-channel attack.

However such masking counter-measures are grossly inefficient as it requires many operations during execution and also utilises much of the microprocessors memory during execution.

It is an aim of the present invention to obviate, or mitigate, at least some of the afore-mentioned disadvantages.

SUMMARY

According to the invention, these aims are achieved by means of a method of counter-measuring against side channel attacks, the method comprising executing a block-cipher algorithm to mask intermediate variables, wherein the block-cipher algorithm comprises one or more non-linear functions, characterised in that at least one of the non-linear functions is implemented using a match-in-place function.

The method of the present invention makes use of a match-in-place function to improve the efficiency of the method. Using a match-in-place function reduces the number of operations which are required to provide an effective counter-measuring against side channel attacks. Furthermore, less memory is required to implement the method of the present invention compared to know methods.

The match-in-place function may be a bit-randomized match-in place function ($MIP^I$ (data; adr,b)).

The bit-randomized match-in place function may be defined as:

$$MIP^I(\text{data}; b \text{ if read } (adr) = adr, b) = \begin{cases} \text{data} \\ b \text{ otherwise} \end{cases}$$

wherein adr is an address in a memory, data is a variable which can be stored at an address in a memory, and b is a value which is returned if the data variable is equal to actual data which is present at the address adr in memory; otherwise the complement of b is returned. b may be a bit value.

The following relationship may exist:

$MIP^I(\text{data};adr;\overline{b})=MIP(\text{data};adr)\oplus b$ wherein $\overline{b}$ is the complement of b.

The at least one of the non-linear function may comprise a $compare_b$ function, defined by:

$$compare_b(x; y)b \text{ if } x = y = \begin{cases} b \text{ if } x \\ \neq y \end{cases}$$

wherein x is the first input variable of the $compare_b$ function and y is the second input variable of the $compare_b$ function, and b is a value which is returned if x is equal to y, such that the $compare_b$ function can be implemented by: writing the variable x to an address adr in memory; executing the bit-randomized match-in place function defined as:

$$MIP^I(y; adr, b) = b \text{ if read } (adr) = \begin{cases} y \\ b \text{ otherwise} \end{cases}$$

and, returning $MIP^I(y; adr, b)$.

The non-linear function may be comprised in a SubByte operation. The non-linear function may be comprised in a SubByte operation of an AES algorithm.

The block-cipher algorithm may further comprise one or more linear functions. At least one of the one or more linear functions may be masked by XORing variables of the function.

The block-cipher algorithm may be an Advanced Encryption Standard (AES) algorithm.

According to a further aspect of the present invention there is provided a computer readable medium comprising a computer program which is configured to implement a method according to any one of the afore mentioned methods.

According to a further aspect of the present invention there is provided a method of computing a second order masked Sbox function from a second order masked input, comprising the steps of:

(i) $b \leftarrow rand(1)$ (ii) for $a = 0$ to $2^n - 1$ do (a) write $(r_1 \oplus a; adr)$ (b) $cmp \leftarrow MIP^I(r_2; adr; b)$ (c) $R_{cmp} \leftarrow (S(x \oplus a) \oplus s_1) \oplus s_2$ (iii) Return $R_b$ wherein, b is a variable which represents a random bit which indexes a register, and a is a variable which represents an index which defines the number of times steps (a)-(c) should be carried out, $r_1$, $r_2$ is a pair of input masks, x is a masked value wherein $x = \tilde{x} \oplus r_1 \oplus r_2 \in F^n_2$, and $s_1$, $s_2$ are a pair of output masks, and adr is a free memory address, cmp is a bit variable which indexes a register and is an output of the function $MIP^I$ ($r_2$; adr; b), $R_{cmp}$ is a register address of a register of a micro-processor. Typically, at least two registers $R_0$ and $R_1$ in the micro-processor are used (i.e. cmp can be 0 or 1; a first register $R_0$ is indexed/addressed if cmp=0, and a second register $R_1$ is indexed/addressed if cmp=1). $R_b$ is a register address of a register of a micro-processor. Typically at least two registers $R_0$ and $R_1$ in the micro-processor are used (i.e. b can be 0 or 1; register $R_0$ is indexed/addressed if b=0, and register $R_1$ is indexed/addressed if b=1). $MIP^I$ ($r_2$; adr; b) is a bit-randomized match-in place function defined as:

$$MIP^I(\text{data}; b \text{ if read } (adr) = adr, b) = \begin{cases} \text{data} \\ b \text{ otherwise} \end{cases}$$

According to a further aspect of the present invention there is provided a computer readable medium comprising a computer program which is configured to carry out the aforementioned method of computing a second order masked Sbox function.

BRIEF DESCRIPTION OF THE DRAWINGS

The invention will be better understood with the aid of the description of an embodiment given by way of example and illustrated by the figures, in which:

FIG. 1 shows Pseudo-code for AES encryption;

FIG. 2 shows Pseudo-code for AES decryption;

FIG. 3 shows a table comprising the number of memory transfers (pre-processing phase), number of XORs and memory transfers (main phase) and memory required for the original implementation of a compare$_b$ function and the implementation of the compare$_b$ function according to the present invention;

FIG. 4 shows a table comprising number of XORs, number of memory transfers and memory required for a full second Rivain-Dottax-Prouff (RDP2) algorithm implementation which uses the method of the present invention to implementation a compare$_b$ function.

DETAILED DESCRIPTION OF POSSIBLE EMBODIMENTS

The use of the method of the present invention in an AES encryption algorithm will be described in detail. However, it should be understood that the method of the present invention is not limited to use with an AES encryption algorithm; the method of the present invention could be used in any block-cipher algorithm.

The AES Encryption Algorithm operates on a 4×4 array of bytes $s_{i,j}$, termed the 'state'. For encryption, each subpart of the AES Encryption Algorithm (except a last subpart) comprises the following four stages:

1. AddRoundKey: each byte of the state is xored with the round key $k_{i,j}$, derived from the key schedule:

$$s_{i,j} \leftarrow s_{i,j} \oplus k_{i,j}$$

2. SubBytes: each byte of the state is updated using an 8-bit S-box function:

$$s_{i,j} \leftarrow S(s_{i,j})$$

The S-box function is defined as:

$$S(x) = \text{Aff}(\text{Inv}(x))$$

where Aff is an affine function over $GF(2^8)$ and $$\text{Inv}(x) = x^{254}$$

is the inverse function over $GF(2^8)$ (with $0 \to 0$)

3. ShiftRows: the bytes of the state are cyclically shifted in each row by a certain offset; the first row is left unchanged.

4. MixColumns: the bytes of the state are modified column by column as follows:

$$s'_{0,c} \leftarrow (02 \cdot s_{0,c}) \oplus (03 \cdot s_{1,c}) \oplus s_{2,c} \oplus s_{3,c}$$

$$s'_{1,c} \leftarrow s_{0,c} \oplus (02 \cdot s_{1,c}) \oplus (03 \cdot s_{2,c}) \oplus s_{3,c}$$

$$s'_{2,c} \leftarrow s_{0,c} \oplus s_{1,c} \oplus (02 \cdot s_{2,c}) \oplus (03 \cdot s_{3,c})$$

$$s'_{3,c} \leftarrow 903 \cdot s_{0,c}) \oplus s_{1,c} \oplus s_{2,c} \oplus (02 \cdot s_{3,c})$$

The pseudo-code for AES encryption with a 128-bit key is given in FIG. 1. The word array 'w' contains round keys ($k_{i,j}$) which are generated by a key-schedule algorithm.

For decryption, every round (except the last) comprises the following operations:

1. InvShiftRows: is the inverse of the ShiftRows operation (stage 3 of encryption). The bytes of the state (a set of intermediate variables used in AES encryption, as defined in paragraph [0025]) are cyclically shifted in each row by a certain offset; the first row of bytes is left unchanged.

2. InvSubBytes: is the inverse of the SubBytes operation (stage 2 of encryption). The inverse S-box ($S^-$) is applied on each byte of the state, with:

$$S^{-1}(x) = \text{Inv}(\text{Aff}^{-1}(x))$$

3. AddRoundKey: the operation is equal to its own inverse.

4. InvMixColumns: is the inverse of the MixColumns operation (stage 4 of the encryption). The bytes of the state are modified column by column as follows:

$$s'_{0,c} \leftarrow (0e \cdot s_{0,c}) \oplus (0b \cdot s_{1,c}) \oplus (0d \cdot s_{2,c}) \oplus (09 \cdot s_{3,c})$$

$s'_{1,c} \leftarrow (09 \cdot s_{0,c}) \oplus (0e \cdot s_{1,c}) \oplus (0b \cdot s_{2,c}) \oplus (0d \cdot s_{3,c})$ $s'_{2,c} \leftarrow (0d \cdot s_{0,c}) \oplus (09 \cdot s_{1,c}) \oplus (0e \cdot s_{2,c}) \oplus (0b \cdot s_{3,c})$ $s'_{3,c} \leftarrow (0b \cdot s_{0,c}) \oplus (0d \cdot s_{1,c}) \oplus (09 \cdot s_{2,c}) \oplus (0e \cdot s_{3,c})$ The pseudo-code for the inverse cipher is given in FIG. 2.

Finally, the round key-schedule ($k_{i,j}$) is based on the following operations:
1. SubWord: takes a four-byte input word and applies the S-box ($S(x)$) to each of the four bytes.
2. RotWord: takes a word [$a_0$; $a_1$; $a_2$; $a_3$] as input and performs a cyclic permutation to return [$a_1$; $a_2$; $a_3$; $a_0$]
3. Xor with Rcon: takes as input a 32-bits word and xor it with the round constant word array Rcon[i]=[$(02)^{i-1}$; 00; 00; 00], for round $1 \le i \le 10$. We refer to [5] for a full description of the key-schedule.

As discussed in the introduction, the principle of the masking counter-measure is to mask every intermediate variable with one or more random masks. In case of the masking counter-measure with order d=2, two masks are used, which gives a total of three shares. More precisely, any state variable p (represented as a byte in AES) is shared into three shares ($p_0$; $p_1$; $p_2$) with:

$p = p_0 \oplus p_1 \oplus p_2$ where the shares $p_1$ and $p_2$ are called the masks.

The three shares $p_0$, $p_1$ and $p_2$ must be processed in such a way that the previous relation is preserved throughout the execution of the encryption algorithm. Note that similarly every byte k of the round key must be shared into three shares ($k_0$; $k_1$; $k_2$) such that $k = k_0 \oplus k_1 \oplus k_2$.

The linear parts of the block-cipher are easy to process. A function f is said to be linear when the following holds:

$f(x \oplus y) = f(x) \oplus f(y)$ \hfill Equation (1)

Then for such linear function when given as input the three shares ($p_0$; $p_1$; $p_2$) such that:

$p = p_0 \oplus p_1 \oplus p_2$ it suffices to compute $f(p_0)$, $f(p_1)$ and $f(p_2)$ separately and forming Equation (1) one obtains:

$f(p) = f(p_0) \oplus f(p_1) \oplus f(p_2)$

Therefore, the three output shares $f(p_0)$, $f(p_1)$ and $f(p_2)$ are a valid sharing of the output f(p). For AES encryption, the AddRoundKey, ShiftRows and MixColumns operation are linear functions and can therefore be processed in this manner. However, the SubBytes operation (such as the S-box function in the case of AES) is non-linear and must be processed differently.

To process non-linear operations such as the S-box function in the case of AES an algorithm can be defined as follows:

$S: \{0;1\}^n \rightarrow \{0;1\}^m$

Note that for AES n=m=8. The algorithm preferably comprises a masked function $compare_b$ defined as follows:

$$compare_b(x; y) b \text{ if } x = y = \begin{cases} b \text{ if } x \\ \ne y \end{cases}$$

where the x and y are the input variables of the $compare_b$ function.

Computation of a second-order masked S-box function from a second-order masked input may be carried out as follows:

Input: A masked value $x = x \oplus r_1 \oplus r_2 \in F^n_2$, wherein $r_1$; $r_2$ is a pair of input masks, and $s_1$; $s_2 \in F^m_2$ is a pair of output masks.

Output: The masked S-box function output $S(x) \oplus s_1 \oplus s_2$.
1. $b \leftarrow rand(1)$
2. for a=0 to 2n−1 do
   (a) $cmp \leftarrow compare_b(r_1 \oplus a; r_2)$
   (b) $Rcmp \leftarrow (S(x \oplus a) \oplus s_1) \oplus s_2$
3. Return $R_b$ Wherein $r_1 \oplus a$; $r_2$ are input variables of the $compare_b$ function, $a = r_1 \oplus r_2$ then $cmp = compare_b(r_1 \oplus a, r_2) = compare_b(r_2; r_2) = b$ which gives $R_b = (S(x \oplus r_1 \oplus r_2) \oplus s_1) \oplus s_2 = S(x) \oplus s_1 \oplus s_2$ as required.

In this particular embodiment, care should be taken when implementing the $compare_b$ function. Namely the $compare_b$ (x; y) function preferably should not be implemented by computing $x \oplus y$ directly, since in the above algorithm this would amount to computing ($r_1 \oplus r_2 \oplus a$) which combined with x would give a second-order leakage.

The method implementing of the $compare_b$ function to prevent any first order side-channel leakage on $x \oplus y$ will now be described:

Recall that the function $compare_b$ is defined as:

$$compare_b(x; y) b \text{ if } x = y = \begin{cases} b \text{ if } x \\ \ne y \end{cases}$$

The method of implementing requires a table T of $2^n$ bits in RAM. The table T is pre-processed as follows:
1. $r_3 \leftarrow \{0; 1\}^n$
2. For i=0 to $2^n - 1$ do $T[i] \leftarrow \bar{b}$
3. $T[r_3] \leftarrow b$ This completes the pre-processing step.

At the end of this pre-processing step, the table T satisfies:

$$b \text{ if } x = T[x] = \begin{cases} r_3 \\ b \\ \text{otherwise} \end{cases}$$

Then the $compare_b$ function is implemented as:
   return $T[(x \oplus r_3) \oplus y]$ In this case all intermediate variables in the computation are independent of $x \oplus y$; this prevents any first-order side-channel leakage on $x \oplus y$.

The above-mentioned implementation of the $compare_b$ is known in the art. Disadvantageously, the above-mentioned implementation of the $compare_b$ is inefficient; the $compare_b$ algorithm requires $2^n$ bits of RAM; in practice however it may be more convenient to use $2^n$ bytes of RAM since otherwise bit-access techniques must be used which might be cumbersome to implement securely. Pre-processing requires $2^n + 1$ memory transfers; such pre-processing must be done before every call to the RDP2 algorithm. Every call to $compare_b$ then requires two XOR operations and one memory transfer. For AES with n=8, the $compare_b$ function therefore requires 256 bytes of RAM and 257 memory transfers during pre-processing. In total, the RDP2 algorithm then requires $6 \cdot 2^n$ XOR operations, $3 \cdot 2^n + 1$ memory transfers and the generation of n+1 random bits.

The method according to the present invention is based on a different implementation of the $compare_b$ function, and in particular an implementation which uses match-in-place function.

Any processor has the usual instructions data←read(adr) and write(data; adr) that read and write some data at some address adr in memory. In match-in-place technology the processor has an additional function MIP(data; adr) that works as follows:

$$MIP(\text{data}; adr) 1 \text{ if read } (adr) == \begin{cases} \text{data} \\ 0 \text{ otherwise} \end{cases}$$

In other words, data is matched at the memory location adr and the value at address adr never leaves the memory.

In the present invention there is provided additional function $MIP^I$ which is a bit-randomized version of the MIP function, defined as follows:

$$MIP^I(\text{data}; b \text{ if read } (adr) == adr, b) = \begin{cases} \text{data} \\ b \text{ otherwise} \end{cases}$$

Preferably there exists the following relationship:

$MIP^I(\text{data};adr;b) = MIP(\text{data};adr) \oplus b$

Using the $MIP^I$ function, the $\text{compare}_b$ function can be simply implemented as follows, where adr is a free address in memory.

$\text{compare}_b$ (x; y):
1. Write (x; adr)
2. Return $MIP^I$ (y; adr; b)

Once x has been written at address adr in memory, the $MIP^I$(y; adr; b) function returns b if x=y and b̄ otherwise, as required by the $\text{compare}_b$ function.

Using the $MIP^I$ function the computation of a second-order masked S-box function from a second-order masked input becomes as follows:

Input: A masked value $x = \tilde{x} \oplus r_1 \oplus r_2 \in F''_2$, a pair of output masks $s_1; s_2 \in F''_2$, a free memory address adr.
Output: The masked S-box function output $S(\tilde{x}) \oplus s_1 \oplus s_2$
1. b←rand(1)
2. for a=0 to $2^n-1$ do
    (a) write ($r_1 \oplus a$; adr)
    (b) cmp←$MIP^I$ ($r_2$; adr; b)
    (c) Rcmp←$(S(x \oplus a) \oplus s_1) \oplus s_2$
3. Return $R_b$ The implementation of the $\text{compare}_b$ function based on the $MIP^I$ function, satisfies the same property as the original $\text{compare}_b$ function implementation; namely all intermediate variables are independent of x⊕y.

Note that the randomized function $MIP^I$(y; adr; b) is preferable. If the function MIP(y; adr) is used instead (by first computing MIP(y; adr) and then returning MIP(y; adr) ⊕b) then the implementation would be insecure, as the intermediate variable MIP(y; adr) is not independent from x⊕y.

FIG. 3 shows a table which compares the efficiency of the original implementation of $\text{compare}_b$ function and the implementation of the $\text{compare}_b$ function according to the present invention (i.e. using the $MIP^I$ function). It is clear that fewer operations and less RAM is required to implement the $\text{compare}_b$ function according to the present invention.

FIG. 4 shows a table which compares the efficiency of a masking algorithm originally implemented and a masking algorithm implemented according to the present invention (i.e. using the $MIP^I$ function). For AES with n=8, the present invention requires 1 byte of RAM (instead of 2n), 1024 XORs (instead of 1536) and 512 memory transfers (instead of 769). If XORs and memory transfers have the same cost, the present invention variant is 33% faster the original implementation. Thus, for the same level of security, the present invention provides a faster counter-measure which requires less RAM.

Various modifications and variations to the described embodiments of the invention will be apparent to those skilled in the art without departing from the scope of the invention as defined in the appended claims. Although the invention has been described in connection with specific preferred embodiments, it should be understood that the invention as claimed should not be unduly limited to such specific embodiment.

The invention claimed is:

1. A method of counter-measuring against side channel attacks, the method comprising executing a block-cipher algorithm on a processor to mask intermediate variables, wherein the block-cipher algorithm comprises one or more non-linear functions, such that at least one of the non-linear functions is implemented using the processor executing a match-in-place function.

2. The method according to claim 1 wherein, the match-in-place function is a bit-randomized match-in place function ($MIP^I$(data; adr,b)).

3. The method according to claim 2 wherein, the bit-randomized match-in place function is defined as:

$$MIP^I(\text{data}; adr, b) = \begin{cases} b & \text{if read } (adr) = \text{data} \\ \bar{b} & \text{otherwise} \end{cases}$$

wherein adr is an address in a memory, data is a variable which can be stored at an address in a memory, and b is a value which is returned if the data variable is equal to actual data which is present at the address adr in memory; otherwise the complement of b is returned.

4. The method according to claim 3 wherein $MIP^I$ (data; adr; b)=MIP (data; adr)⊕b̄ wherein b̄ is the complement of b.

5. The method according to claim 2 wherein, the at least one of the non-linear function comprises a $\text{compare}_b$ function, defined by:

$$\text{compare}_b(x; y) = \begin{cases} b & \text{if } x = y \\ \bar{b} & \text{if } x \neq y \end{cases}$$

wherein x is the first input variable of the $\text{compare}_b$ function and y is the second input variable of the $\text{compare}_b$ function, and b is a value which is returned if x is equal to y, and b̄ is a value which is returned if x is not equal to y, such that the $\text{compare}_b$ function can be implemented by; writing the variable x to an address adr in memory; executing the bit-randomized match-in place function defined as:

$$MIP^I(\text{data}; adr, b) = \begin{cases} b & \text{if read } (adr) = y \\ \bar{b} & \text{otherwise} \end{cases} \text{ and, returning } MIP^I(y; adr, b).$$

6. The method according to claim 1 wherein, the non-linear function is comprised in a SubByte operation.

7. The method according to claim 1 wherein, the block-cipher algorithm further comprises one or more linear functions, wherein at least one of the one or more linear functions are encrypted by XORing the variables of the function.

8. The method according to claim 1 wherein, the block-cipher algorithm is an Advanced Encryption Standard (AES) algorithm.

9. A non-transitory computer readable medium comprising a computer program which is configured to implement a method of counter-measuring against side channel attacks, the method comprising executing a block-cipher algorithm to mask intermediate variables, wherein the block-cipher algorithm comprises one or more non-linear functions, characterised in that at least one of the non-linear functions is implemented using a match-in-place function.

10. A cipher apparatus operatively arranged to execute, with a computer comprising processor configured to execute a computer program including a block-cipher algorithm to mask intermediate variables, wherein the block-cipher algorithm comprises one or more nonlinear functions, at least one of the non-linear functions being implemented using a match-in-place function of the processor.

11. A method of counter-measuring against side channel attacks, the method comprising using a computer to execute a computer program including a block-cipher algorithm to mask intermediate variables, wherein the block-cipher algorithm comprises one or more non-linear functions, at least one of the non-linear functions being implemented using a processor having a match-in-place function, further comprising computing a second order masked Sbox function from a second order masked input, by the steps of:

(i) $b \leftarrow \text{rand}(1)$
(ii) for $a=0$ to $2^n-1$ do
  (a) write $(r_1 \oplus a; \text{adr})$
  (b) $\text{cmp} \leftarrow \text{MIP}^1(r_2; \text{adr}; b)$
  (c) $\text{Rcmp} \leftarrow (S(\tilde{x} \oplus a) \oplus s_1) \oplus s_2$
(iii) Return $R_b$.

12. A method of counter-measuring against side channel attacks, the method comprising using a computer to execute a computer program including a block-cipher algorithm to mask intermediate variables, wherein the block-cipher algorithm comprises one or more non-linear functions, characterised in that at least one of the non-linear functions is implemented using a match-in-place function defined as:

$$MIP^I(\text{data}; adr, b) = \begin{cases} b & \text{if read } (adr) = \text{data} \\ \bar{b} & \text{otherwise} \end{cases}$$

wherein adr is an address in a memory, data is a variable which can be stored at an address in a memory, and b is a value which is returned if the data variable is equal to actual data which is present at the address adr in memory; otherwise the complement of b is returned.

13. The method of claim 12, wherein $\text{MIP}^I$ (data; adr; b)=MIP(data; adr)$\oplus \bar{b}$ wherein $\bar{b}$ is the complement of b.

* * * * *